March 21, 1961    J. A. OP DE BEECK    2,975,690
ROLL FILM CAMERA WITH FOCAL PLANE SHUTTER MECHANISM
Filed Aug. 5, 1958    3 Sheets-Sheet 1
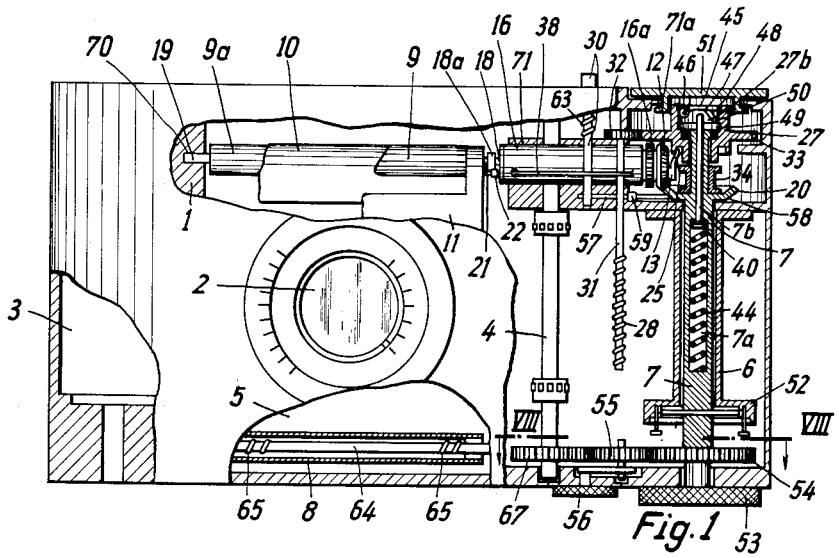
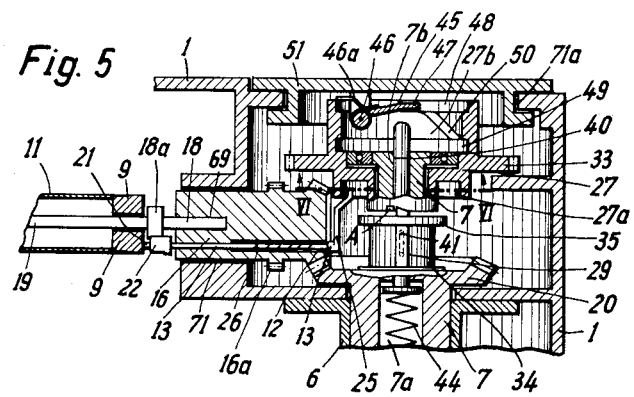
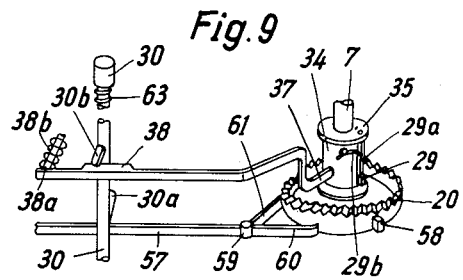
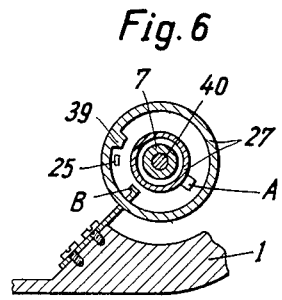
Inventor:
Alphonse Op de Beeck March 21, 1961   J. A. OP DE BEECK   2,975,690
ROLL FILM CAMERA WITH FOCAL PLANE SHUTTER MECHANISM
Filed Aug. 5, 1958   3 Sheets-Sheet 2
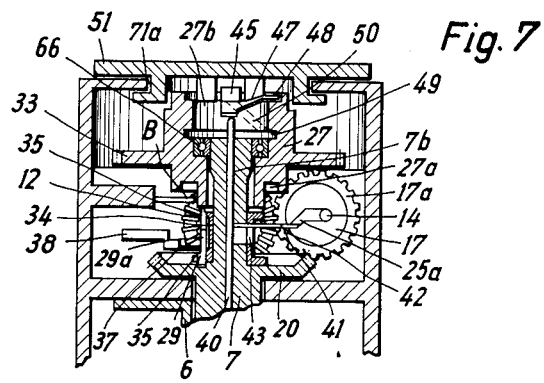
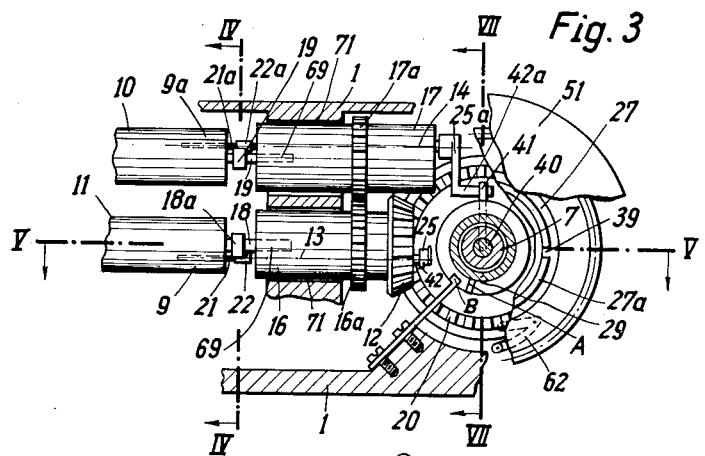
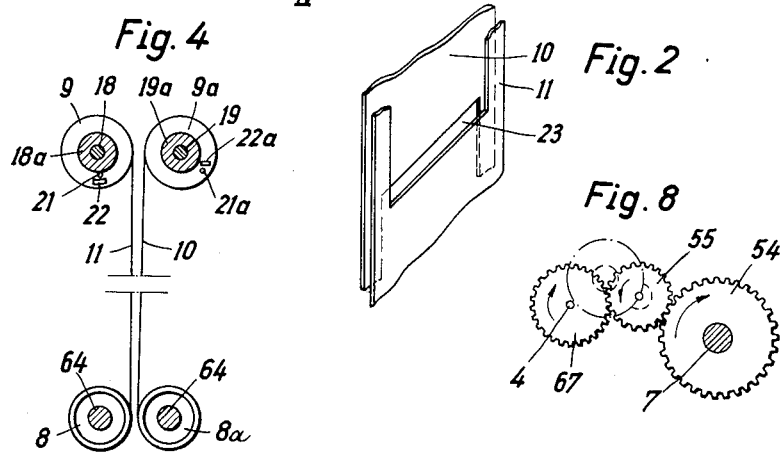
Inventor:
Alphonse Op de Beeck

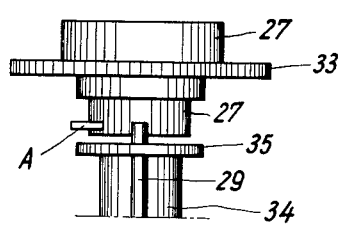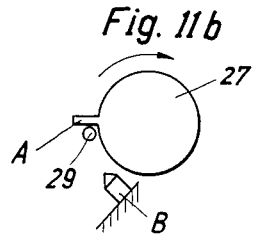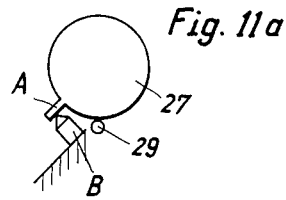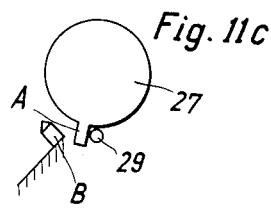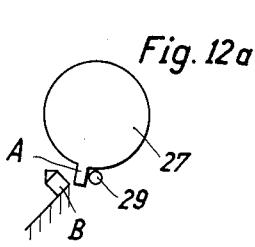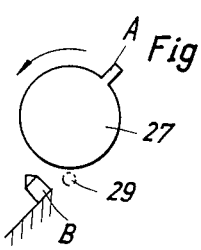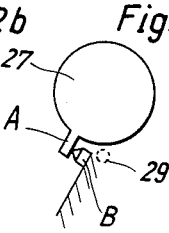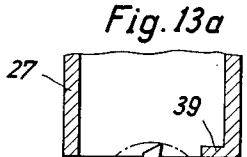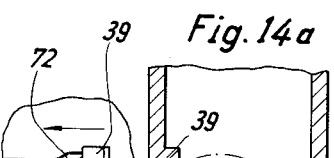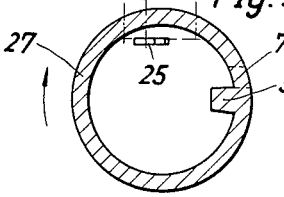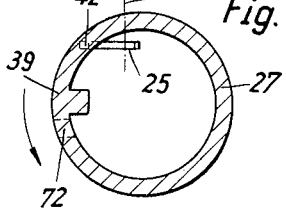

United States Patent Office 2,975,690
Patented Mar. 21, 1961

2,975,690
ROLL FILM CAMERA WITH FOCAL PLANE SHUTTER MECHANISM

Joseph Alphonse Op de Beeck, 48 Ave. du Parc, St. Gilles, Brussels, Belgium

Filed Aug. 5, 1958, Ser. No. 753,348

13 Claims. (Cl. 95—31)

This is a continuation-in-part of my application Serial Number 382,044, filed September 24, 1953, and since abandoned.

The present invention relates to a roll film camera with a housing and a focal plane shutter mechanism having a first leading curtain and a second subsequently following curtain on respective pairs of spring actuated rollers and release rollers, a winding mechanism for rotating the release shutter curtain roller of each pair of shutter curtain rollers and for tensioning the driving spring mechanisms of the spring actuated shutter curtain rollers, and a coupling and releasing mechanism operative between the winding mechanism and said releasing shutter curtain rollers.

Known cameras of this type do not operate in the best possible manner; their shutter curtains do not move with a great enough acceleration and speed because these shutter curtains and curtain rollers are interconnected during the release operation with other parts of the shutter mechanism different from the shutter curtains and shutter curtain rollers per se so that the movement of the shutter curtains during the release operation is undesirably influenced by the masses and inertia of these parts which do not form part of the shutter curtains and the curtain rollers per se.

One of the objects of the invention is to overcome the above drawbacks by providing a shutter type which presents shutter curtains and shutter curtain rollers which operate entirely independently of the other parts of the shutter mechanism during the release operation.

A further object of the present invention is to provide shutter curtains which move at a much greater speed than known shutter curtains.

Another object of the present invention is to provide a release means for independently releasing a pair of shutter curtains in a predetermined sequence.

An additional object of the present invention is to provide an adjusting means for adjusting the time between the release of a pair of shutter curtains so as to regulate the opening formed by the shutter curtains.

Still another object of the present invention is to provide an apparatus which enables the factors which influence the movement of a pair of shutter curtains to be identical for each curtain.

Yet another object of the present invention is to provide a camera capable of accomplishing all of the above objects and which is made up of simply and ruggedly constructed parts which are very reliable in operation.

With the above objects in view, the present invention mainly consists of a coupling and releasing mechanism between said winding mechanism and said release shutter rollers, on a roll film camera of the type described above, which comprise a pivotal cylindrical supporting body for each release shutter curtain roller coaxially and cooperatively disposed thereto and in driving connection with other parts of said winding mechanism, said coupling mechanism consisting of an eccentrically fixed coupling projection at the end face of each of said release shutter curtain rollers, and a movable coupling crank at the opposing end face of the respective cylindrical supporting body engaging said opposite coupling projection and being mounted upon a turnable shaft eccentrically arranged in each of said cylindrical supporting bodies, said releasing mechanism being operatively connected with said coupling cranks for separatively moving the latter out of engagement with said corresponding opposite coupling projections, so as to independently release said shutter curtain rollers and said shutter curtains to the influence of said driving spring mechanism of said spring actuated shutter curtain rollers. In each of said cylindrical supporting bodies is centrally disposed a supporting shaft fixed with one end in the corresponding cylindrical supporting body and pivotally mounted with the other end in said camera housing to bear the respective adjacent release shutter curtain roller for free rotation.

Further novel features which are considered as characteristic for the invention are set forth in particular in the following description in connection with the accompanying drawings and in the appended claims. The invention itself, however, both as to its construction and its method of operation, together with additional objects and advantages thereof, will be best understood from the following description of specific embodiments when read in connection with the accompanying drawings, in which:

Fig. 1 is a front view of a camera having portions of the housing front wall thereof broken away to show, partly diagrammatically and partly in section, the structure of the present invention in elevation;

Fig. 2 is a fragmentary perspective view of the shutter curtains of the present invention, showing how these curtains cooperate to form a slot for exposing the film;

Fig. 3 is a fragmentary, partly sectional top plan view on an enlarged scale of part of the structure for winding the shutter curtains and part of the structure for controlling the operation of the structure of the invention;

Fig. 4 is a partly sectional and partly diagrammatic view of the structure of Fig. 3 and is taken along line IV—IV of Fig. 3 in the direction of the arrows;

Fig. 5 is a sectional view on an enlarged scale of the structure shown in the upper right hand portion of Fig. 1 and is taken along line V—V of Fig. 3;

Fig. 6 is a sectional view taken along line VI—VI of Fig. 5 looking upwardly;

Fig. 7 is a fragmentary sectional view taken along line VII—VII of Fig. 3 in the direction of the arrows and showing structure located above the plane of Fig. 3;

Fig. 8 is a fragmentary sectional view taken along line VIII—VIII of Fig. 1 looking downwardly;

Fig. 9 is a fragmentary perspective view of the shutter operating member of the camera and the parts controlled thereby;

Fig. 10 is a fragmentary elevational view of a part of the control apparatus of the invention;

Figs. 11a to 11c are diagrammatically illustrated different positions of the structure parts 27A, 29B of Fig. 10 to each other during the movement of loading the shutter device;

Figs. 12a to 12c are diagrammatical illustrations of the same structure parts in different positions during the movement of releasing the shutter device;

Figs. 13a and 13b are an elevational and a plan view in section of structure parts 27, 39, 25, 13 of the release device in a position during the movement of loading the shutter device; and Figs. 14a and 14b are an elevational and a plan view in section of the structure parts 27, 39, 25, 15 in a position during the movement of releasing the shutter device.

Referring now to the drawings, to Fig. 1 in particular, 1 designates a camera housing having an objective 2 on the front wall thereof. This camera housing 1 is provided in a known way with a chamber 3 for the unexposed film, and a film transporting means 4 of known per se construction (Figs. 1 and 8) is turnably located in the camera housing 1 for moving film from a film spool in the chamber 3 through the space in the camera located behind the objective 2. A take-up spool 6 is provided to receive the exposed film after it moves beyond the space behind objective 2. In this space between the film and the objective 2 a shutter 5, made up of a pair of curtains 10 and 11, is provided to expose the film.

In connection and cooperation with the take-up spool 6 a winding shaft 7 is turnably mounted in the camera for turning the spool 6, this winding shaft 7 being designed on the one hand to actuate the film transporting means 4 for moving the amount of film required for each exposure during one rotation of shaft 7 and on the other hand to cooperate with the structure for loading the shutter mechanism. The take-up spool 6 is connected to the winding shaft 7 through the medium of a slip clutch 52, for example, which may be of a known per se construction. At the exterior of the camera housing 1 a knob 53 is fixed to the shaft 7 so that the operator may turn the latter through one revolution after each exposure. The film transporting means 4 is operated, upon the rotation of shaft 7, through the medium of a gear 54 fixed to the shaft 7 for rotation therewith and meshing with a gear 55 which in turn meshes with a gear 67 of the film transporting means 4. As is apparent from Figs. 1 and 8, a knob 56 is connected through a suitable linkage with the gear 55 for shifting the latter into and out of mesh with gear 54 and film transporting means 4 so that the drive from shaft 7 to the film transporting means 4 may be disconnected when desired.

The shaft 7 has a bevel gear 20 fixed thereto for rotation therewith, and a projection 58 (Figs. 3, 9) is fixed to this gear 20 and engages a stop arm 60 of a 3-arm lever 57, 60, 61 at the end of each complete rotation of shaft 7 so as to prevent turning of shaft 7 through more than one revolution after each exposure. This 3-arm lever is pivotally mounted at 59 on a stationary part of the housing 1 for turning movement about a pivot parallel to shaft 7. The arm 57 of this lever 57, 60, 61 is located transversely and adjacent to the shutter operating plunger 30 which is vertically shiftably guided in an inner wall and the top wall of the housing 1 and yieldingly held in its uppermost position by a spring 63 (Figs. 1, 9) which abuts a lateral projection in the pin and a part of the housing 1 in a known manner. As is apparent from Fig. 9, the plunger 30 is provided with a wedge-shaped cam 30a which engages arm 57 to turn the three-arm lever 57, 60, 61 in a clockwise direction about its pivot 59, so as to move arm 60 out of the path of projection 58 at the bevel gear 20 to release shaft 7 for turning movement. When this shaft 7 turns, the projection 58 engages arm 61 to return arm 60 to its initial position where its free end is again in the path of movement of projection 58 to be engaged by the latter when the shaft 7 has made one revolution. In this position the arm 57 may be engaged again by the wedge-shaped cam 30a of plunger 30 at the next depression of the plunger 30 for a new exposure. As is shown in Fig. 3, a springy pawl 62 engages the teeth of gear 20 to prevent shaft 7 from turning in a direction opposite to that for winding of exposed film into the take-up spool 6.

In order to be able to reduce the time of the exposure between the opening of the exposure slit of the two curtains by the leading curtain and the closing of said slit by the second subsequently following curtain, the curtains 10 and 11 of the shutter 5 are arranged so as to be movable transversely of the movement of the film to be exposed. Each of the shutter curtains 10 and 11 is wound at one end on a roller 8, 8a respectively located in parallel position adjacent the bottom wall of the camera housing 1 and at its opposite end on a roller 9, 9a respectively located in parallel position adjacent the top wall of the camera housing 1, these rollers 8, 8a and 9, 9a being respectively located on opposite sides of the optical axis. As is apparent from Fig. 4, the pair of upper rollers 9, 9a are arranged opposite each other while the pair of lower rollers 8, 8a are also arranged opposite each other. Fig. 2 clearly shows how each of the shutter curtains 10, 11 is formed with a covering portion and with a pair of bands extending from this covering portion. In the case of curtain 11 the two bands thereof are connected to the upper roller 9, while the covering portion thereof is connected to the lower roller 8 located directly beneath this upper roller 9. From the curtain 10, however, the covering portion is connected to the other upper roller 9a while the two pull-bands thereof are connected to the other lower roller 8a so that the curtains 10 and 11 may cooperate to form an exposure slot 23, as shown in Fig. 2.

As is evident from Fig. 1, each of the lower rollers 8, 8a is mounted for free rotation on a shaft 64, stationarily mounted in the housing 1, and a tensioning spring 65 is located within each roller 8, 8a about the shaft 64, this spring being fixed at one end to the stationary shaft 64 and at its opposite end to the respective pivotal roller 8, 8a in which it is located. The upper shutter curtain rollers 9, 9a are loosely pivotally mounted on the shafts 18, 19 which are pivotally mounted with one end at 70 in the camera housing 1 and with the other end at 69 fixed to the central part of the cylindrical supporting bodies 16, 17 pivotally mounted for free rotation at 71 in the camera housing 1, in parallel position to each other and coaxial to the corresponding shutter curtain rollers 9, 9a. The cylindrical supporting body 16 is provided at one end with a bevel gear 12 which is in engagement with the bevel gear 20 fixed to the shaft 7. The diameter of the bevel gear 20 is just as large or is much larger than and a multpile of the diameter of the bevel gear 12, so that the cylindrical bodies 16, 17 are rotated for one revolution or a predetermined number of revolutions during one revolution of the shaft 7. The two cylindrical bodies 16, 17 are in driving connection with each other by gears 16a, 17a fixed to them and engaging each other. In the space between the opposite end faces of the roller 9 and the corresponding supporting body 16 the shaft 18 is provided with a guide flange 18a between the roller 9 and the cylindrical body 16 for preventing longitudinal displacement of the pivotal roller 9 on the shaft 18, and the shaft 19 is correspondingly provided with a guide flange 19a for the same purpose with respect to the roller 9a and the cylindrical body 17. On the end face of each roller 9, 9a opposite to the end face of the respective cylindrical body 16 or 17 is fixed an eccentrically positioned axially projecting pin 21, 21a. In each of the cylindrical bodies 16, 17 are provided movable transmission and releasing means, including shaft portions 13, 14 eccentrically and pivotally disposed parallel to the axis of rotation of the cylindrical bodies 16, 17. Crank portions 22, 22a are fixed to one end of the shafts 13, 14 at the end faces of the cylindrical bodies 16, 17 opposite the corresponding end faces of the rollers 9, 9a and adapted to cooperate with the pins 21, 21a and to serve as abutment means for these pins 21, 21a during the loading movement transmission between the cylindrical bodies 16, 17 and the shutter rollers 9, 9a when the cylindrical bodies are rotated by the camera shaft 7 over the bevel gears 20, 12 and the gears 16a and 17a, and as locking means in the loaded position of the shutter rollers 9, 9a, 8, 8a, when they abut against said guide flanges 18a, 19a of the shafts 18, 19. At the other end of the shafts 13, 14 projecting from the opposite end faces of the bodies 16, 17 there are fixed crank portions 25, 25a which engage cooperating mechanisms adapted to turn the cranks 25, 25a in a predetermined sequence, after loading of the shutter, so as to respectively turn crank portions 22, 22a out of the path of the pins 21, 21a when the shutter rollers 9, 9a are to be released, for free rotation, during the exposure of the film, by independent influencing. This is executed by different control or releasing means against the action of coil springs 26, disposed within respective spaces in the bodies 16, 17 and fixed at one end to the bodies 16, 17 and at the other end to the respective shaft 13 or 14. The springs 26 yieldingly hold the shafts 13, 14 and the crank portions 22, 22a in the position in which the latter engage the pins 21, 21a.

On the upper part of the camera main shaft 7 a sleeve-like turning member 27 is coaxially mounted for free rotation by means for example of a ball bearing 66. Between this turning member 27 and the bevel gear 20 a flanged sleeve 34 is located in fixed relation with the shaft 7. In vertical bores of the opposite flanges 35 of this sleeve 34 a lock member 29 is guided which is yieldably held by a spring 29b at the sleeve 34 in its upper operating position in which it extends with its upper end above the upper end of the sleeve 34 to engage a radial projection or a pin A at the lower end of the turning member 27 to transmit the rotation of shaft 7 to the turning member 27. The pin A also cooperates with a stationary stop B in the camera housing 1 for limiting the rotary movement of the turning member to less than one revolution. For urging the lock member 29 downwardly, for disengagement of the lock member 29 from the projection pin A of the turning member 27, a control lever 38 is pivotally mounted in the housing 1 at 38a and engages a lateral recess 29a in the lock member 29 with its free end 37. A spring 38b, fixed to the camera housing 1, yieldingly urges lever 38 toward its upper position of rest and a lateral projection 30b on the shutter operating plunger 30 engages the lever 38 to permit selective downward movement of the lever 38 via operation of the plunger. By these means the control lever 38 with its free end 37 and the lock member 29 are moved downwardly when the shutter operating plunger 30 is depressed to expose the film (Figs. 1, 9).

Fixed to the turning member 27 is a gear 33 which meshes with a gear 32 fixed to a shaft 31 pivotally disposed parallel to the camera main shaft 7 in the camera housing 1. Coiled about this shaft 31 is a spring 28 one end of which is fixed to the shaft 31 and the other end to a stationary part of the housing 1 in a manner whereby the spring 28 is tensioned when the shaft 31 is rotated through the gears 32, 33, the turning member 27 and the coupling means A, 29, 34 from the main shaft 7 during the revolution of the shaft 7 for loading the shutter device.

The turning member 27 is provided at its lower surface portion with an annular space 27a and at the lower edge of this space 27a with an inwardly projecting cam 39 to cooperate with the crank 25 of the release shaft 13 for the shutter roller 9. When the shutter is loaded by the main shaft 7 in the described manner, the crank 25 moves with the rotating cylindrical body 16 and its top end 42 extends at the end of the loading operation into the annular space 27a of the turning member 27, as seen in Figs. 13a, 13b. Upon releasing and rotating of the turning member 27 the top end 42 is engaged by the cam 39 to turn the crank 25, the shaft 13 and the crank 22 so as to move the latter out of the path of the coupling pin 21 of the roller 9 to release this roller 9 and the curtain 11. If the crank 25 is located near the outer circumference of the space 27a, as shown in the drawing (Figs. 13a, 13b) the top end 42 of the crank 25 passes during this operation through a small recess 72 adjacent said cam 39 and abuts against the outer bottom peripheral surface of the turning member 27 as shown in Figs. 14a and 14b so that crank 22 of cylindrical body 16 is moved outwardly out of the path of movement of the pin 21 during the release movement of curtain 11. The spring 26 of shaft 13 can also be so tensioned and the masses of the cranks 22, 25 and their shaft 13 can be so dimensioned that the backward movement of the cranks 22, 25 and their shaft 13 occurs so slowly that the releasing movement of the curtain 11 and the revolutions of its rollers 9, 8 are finished before the crank 22 is again within the path of the pin 21. Upon turning of the shaft 7 to reload the shutter device and to wind up the curtain 11 again upon the roller 9, the crank 25 of the cylindrical body 16 turns with this body 16 and returns under the influence of spring 26 to its initial rest position in which it can again enter into the annular bottom space 27a of turning member 27 without touching the latter into the position to be again engaged by cam 39 and in which crank 22 is again located in the path of movement of the pin 21 of roller 9.

As is apparent from Figs. 1 and 7 the main shaft 7 has a central axial bore 7a to form a space for a spring 44 and an axial bore 7b of smaller diameter to locate an elongated slidable rod 40 therein the bottom end of which is engaged by the spring 44 to urge the rod 40 upwardly against a respective abutment in the shaft 7. A transverse rod 41 is fixed to the rod 40 and extends laterally through lateral longitudinal slots 43 formed in the shaft 7 and in the sleeve 34 and communicating with the axial bore 7b of the shaft 7. By this means the sleeve 34 is constrained to rotate with shaft 7. The transverse rod 41 extends into the range of a rod 42 transversely fixed to the crank 25a of the cylindrical body 17 (Fig. 3).

The turning member 27 is formed at its upper end with a cylindrical space 27b, into which the top free end of rod 40 extends (Fig. 5). The cylindrical space 27b is widened at its bottom to an annular groove 49 and at the upper end to an annular seat 48 open to the upper side. Between the groove 49 and the seat 48 is formed in the lateral wall of the space 27b a helical groove 50 communicating with the groove 49 and the seat 48.

Above the top end of the axial rod 40 is located a lever 45 pivotably mounted at 46 on the underside of a plate-like adjustable support 51 rotatably disposed in the top wall of the camera housing 1 about the axis of shaft 7 or an axis parallel to the latter. This plate-like support 51 may be made of two parts which are threadedly connected together so as to form an outer annular groove 71a into which the edge of a respective opening of the camera housing 1 extends, so as to allow free turning of the support 51 about the axis of the shaft 7 or an axis parallel thereto. Any suitable graduation indicating the width of the slot 23 of the shutter curtains 10, 11 (Fig. 2) dependent upon the angular position of this support plate 51 may be provided on the top wall of the camera housing 1 to cooperate with an index mark on the top face of the support plate 51. The free end 47 of the lever 45 is pressed by a spring 46a upon the upper lateral seat 48 of the cylindrical space 27b of the turning member 27 and is not in contact with the upper end of the rod 40. Upon release of the turning member 27 by depressing the shutter operating plunger 30 and disengaging the lock member 29 from projection A of the turning member 27 the latter is rotated by the tensioned spring 28 through the shaft 31, gears 32, 33 in counterclockwise direction, as viewed from the top of the camera. Thereby the end 47 of the lever 45 moves from the upper seat 48 into the helical groove 50 to the lower annular groove 49 so that the lever 45 presses against the top end of the rod 40 to depress the latter against the action of spring 44 so as to move the transverse rod 41 downwardly to turn crank 25a of the cylindrical body 17, via transverse rod 41, in a counterclockwise direction, as viewed in Fig. 7, so as to release the roller 9a and the curtain 10. This release of curtain 10 will take place later than the release of curtain 11. Cam 39 and helical groove 50 are disposed on member 27 relative to lever 25 and lever end 47 respectively in a manner whereby, upon release of member 27, by actuation of plunger 30, crank 25 is actuated before lever 45. First, the crank 25 is influenced by the cam 39 to move the crank 22 of the cylindrical body 16 so that such crank 22 comes out of the path of the pin 21 of curtain roller 9. Some time later the lever 45 is moved through the helical groove 50 from the upper seat 48 into the lower annular groove 49 and the rod 40 is depressed causing, by transverse rod 41, the turning of the cranks 25a and 22a to move the latter out of the path of the pin 21a of roller 9a to release the curtain 10. The angular position of rotatable support 51 for the pivot 46 of lever 45 controls the time when the free end 47 of the lever 45 enters the helical groove 50 to begin the release operation of curtain 10. Thus the width of the slot 23 of the two curtains 10, 11 is controlled and can be adjusted or regulated. During loading of the shutter device by turning the main shaft 7 in clockwise direction as viewed in Fig. 3, the transverse rod 41 immediately moves away from the transverse rod 42a of crank 25a of the cylindrical body 17 so that this crank 25a returns to its rest position under the influenc of the corresponding spring 26 to again locate crank 22a of the cylindrical body 17 in the path of pin 21a of the roller 9a so that the winding means may wind this roller 9a and the curtain 10.

It is believed to be apparent that with the above described apparatus, the shutter structure is coupled only during loading thereof to the winding apparatus through the engagement between pins 21, 21a and cranks 22, 22a respectively. The release structure of the invention tion separately moves the cranks 22, 22a respectively away from the pins 21, 21a so that upon release of the shutter, the shutter curtains and the shutter curtain rollers are completely separated from the remaining shutter structure and are in no way influenced thereby. Moreover, each of the curtains 10, 11 and its associated rollers is of the same construction and weight as the other curtain and its associated rollers so that the movement of the curtains 10, 11 relative to each other may be very accurately controlled and the fact that no structure is connected to the shutter curtain rollers during release thereof enables the curtains 10, 11 to move at a very high speed.

It will be understood that each of the elements described above, or two or more together, may also find a useful application in other types of camera shutters differing from the types described above.

While the invention has been illustrated and described as embodied in a camera apparatus having shutter curtains, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a roll film camera with a housing, a focal plane shutter mechanism including a first leading curtain and a second subsequently following curtain, curtain supports for each curtain disposed independently from each other for free rotation about their axes in said housing and comprising a spring actuated roller and a releasing roller, said supports having a support member which is mounted on the camera housing, a winding mechanism for rotating the releasing curtain roller of each curtain and for tensioning the separated independent driving spring mechanisms of the spring actuated curtain rollers, coupling and releasing mechanisms operative between said winding mechanism and each of said releasing curtain rollers, each of said coupling and releasing mechanisms including a pivotal cylindrical supporting body for the respective releasing curtain roller coaxially and cooperatively disposed relative thereto and in driving connection with said winding mechanism, each of said coupling mechanisms including an eccentrically fixed coupling projection at the end face of each of said release curtain rollers, and a movable coupling crank at the opposing end face of the respective cylindrical supporting body engaging the respective coupling projection and being mounted upon a movable shaft eccentrically disposed in said cylindrical supporting body, said releasing mechanism being operatively connected with said coupling cranks for independently moving the latter out of engagement with the corresponding opposite coupling projection, so as to independently release said curtain rollers and curtains to the influence of said driving spring mechanisms of said spring actuated curtain rollers.

2. In a roll film camera with a housing, a focal plane shutter mechanism including a first leading curtain and a second subsequently following curtain, curtain supports for each curtain disposed independently from each other for free rotation about their axes in said housing and comprising a spring actuated roller and a releasing roller, a winding mechanism for rotating the releasing curtain roller of each curtain and for tensioning the separated independent driving spring mechanisms of the spring actuated curtain rollers, coupling and releasing mechanisms operative between said winding mechanism and each of said releasing rollers, each of said coupling and releasing mechanisms including a pivotal cylindrical supporting body for the respective releasing curtain roller coaxially and cooperatively disposed relative thereto and in driving connection with said winding mechanism, a centrally disposed supporting shaft in each of said cylindrical supporting bodies mounted with one end in the corresponding cylindrical supporting body and with the other end mounted in said camera housing and adapted to bear the respective adjacent release curtain roller for free rotation, each of said coupling mechanisms including an eccentrically fixed coupling projection at the end face of each of said release curtain rollers and a movable coupling crank at the opposing end face of the respective cylindrical supporting body engaging the respective coupling projection and being mounted upon a turnable shaft eccentrically disposed in said cylindrical supporting body, said releasing mechanism being operatively connected with said coupling crank for independently moving the latter out of engagement with the corresponding opposite coupling projection so as to independently release said curtain rollers and curtains to the influence of said driving spring mechanisms of said spring actuated curtain rollers.

3. In a roll film camera with a housing, a focal plane shutter mechanism including a first leading curtain and a second subsequently following curtain, curtain supports for each curtain disposed independently from each other for free rotation about their axes in said housing and comprising a spring actuated roller and a releasing roller, said supports having a support member which is mounted on the camera housing, a winding mechanism for rotating the release curtain roller of each curtain and for tensioning the separated independently driving spring mechanisms of the spring actuated curtain rollers, coupling and releasing mechanisms operative between said winding mechanism and each of said releasing curtain rollers, each of said coupling and releasing mechanisms including a pivotal cylindrical supporting body for the respective releasing curtain roller coaxially and cooperatively disposed relative thereto and in driving connection with said winding mechanism, each of said coupling mechanisms including an eccentrically fixed coupling projection at the end face of each of said release curtain rollers, and a movable coupling crank at the opposing end face of the respective cylindrical supporting body engaging the respective coupling projection and being mounted upon a turnable shaft eccentrically disposed in said cylindrical supporting body, connecting means interconnecting said cylindrical supporting bodies for simultaneous rotation about their axes, gear means for driving connection between said cylindrical supporting bodies and a driving shaft of the camera for rotating the former and transmitting rotation through said movable coupling cranks and coupling projections and the corresponding release curtain rollers for simultaneously winding said shutter curtains thereon and tensioning the driving spring mechanisms of said spring actuated curtain rollers, said releasing mechanism being operatively connected with said coupling crank for independently moving the latter out of engagement with the corresponding opposing coupling projection, so as to independently release said curtain rollers and said curtains to the influence of said driving spring mechanisms of said spring actuated curtain rollers.

4. In a roll film camera with a housing, a focal plane shutter mechanism including a first leading curtain and a second subsequently following curtain, curtain supports for each curtain disposed independently from each other for free rotation about their axes in said housing and comprising a spring actuated roller and a releasing roller, said supports having a support member which is mounted on the camera housing, a winding mechanism for rotating the releasing curtain roller of each curtain and for tensioning the separated independent driving spring mechanisms of the spring actuated curtain rollers, coupling and releasing mechanisms operative between said winding mechanism and each of said releasing curtain rollers, each of said coupling and releasing mechanisms including a pivotal cylindrical supporting body for the respective releasing curtain roller coaxially and cooperatively disposed relative thereto and in driving connection with said winding mechanism, each of said coupling mechanisms including an eccentrically fixed coupling projection at the end face of each of said release curtain rollers, and a movable coupling crank at the opposing end face of the respective cylindrical supporting body engaging the respective coupling projection and being mounted upon a turnable shaft eccentrically disposed in said cylindrical supporting body, a second crank fixed to the other end of each of said turnable eccentric shafts, and a spring means for resiliently holding each of said turnable eccentric shafts, and a spring means for resiliently holding each of said turnable shafts in a position for engagement of the first coupling crank with said coupling projection, said releasing mechanism being cooperatively connected with said second crank for independently moving the corresponding coupling cranks out of engagement with said corresponding opposing coupling projections on said release rollers, so as to independently release said curtain rollers and said curtains to the influence of said driving mechanism of said spring actuated shutter curtain rollers.

5. In a roll film camera with a housing, a focal plane shutter mechanism including a first leading curtain and a second subsequently following curtain, curtain supports for said curtains disposed independently from each other for free rotation about their axes in said housing and comprising a spring actuated roller and a releasing roller, said supports having a support member which is mounted on the camera housing, a winding mechanism for rotating the release curtain roller of each curtain and for tensioning the separated independent driving spring mechanisms of the spring actuated curtain rollers, coupling and releasing mechanisms operative between said winding mechanism and each of said releasing curtain rollers, each of said coupling and releasing mechanisms including a pivotal cylindrical supporting body for the respective releasing curtain roller coaxially and cooperatively disposed thereto and in driving connection with said winding mechanism, each of said coupling mechanisms including an eccentrically fixed coupling projection at the end face of each of said release curtain rollers, and a movable coupling crank at the opposing end face of the respective cylindrical supporting body engaging the respective coupling projection and being mounted upon a turnable shaft eccentrically disposed in said cylindrical supporting body, connecting means interconnecting said cylindrical supporting bodies for simultaneous rotation about their axes, a first gear rigid with one of said cylindrical supporting bodies, a second gear fixed to a driving shaft, meshing with said first gear, a takeup spool mounted on said driving shaft for winding exposed film so that rotation of said driving shaft is transmitted through said gears, said release mechanism being operatively connected with said coupling cranks for independently moving the latter out of engagement with said opposing coupling projections at said release rollers, so as to independently release said curtain rollers and said curtains to the influence of said driving spring mechanism of said spring actuated curtain rollers.

6. In a roll film camera as defined in claim 5, said releasing mechanism comprising a turning member coaxially and turnably mounted for free rotation on said driving shaft, a releasable lock member for interconnecting said turning member and said driving shaft for simultaneous turning movement and selectively releasing said turning member from said driving shaft, and spring means operatively connected to said turning member wherein said spring means is tensioned by turning said turning member together with said driving shaft and drives said turning member independently of said driving shaft in contrary direction of rotation upon release of said turning member from said driving shaft.

7. In a roll film camera as defined in claim 5, said releasing mechanism comprising a turning member coaxially and turnably mounted for free rotation on said driving shaft, a releasable lock member for interconnecting said turning member and said driving shaft for simultaneous turning movement and for selectively releasing said turning member from said driving shaft, a first gear fixed to said turning member, a gear shaft mounted parallel to said driving shaft in said camera housing, a second gear rotatably mounted on said gear shaft and meshing with said first gear, and a spring operatively connected to said gear shaft wherein said spring is tensioned by turning of said turning member together with said driving shaft and drives said turning member independently of said driving shaft in contrary direction of rotation upon release of said turning member from said driving shaft.

8. In a roll film camera as defined in claim 5, said releasing mechanism comprising a turning member coaxially and turnably mounted for free rotation on said driving shaft, a flanged sleeve secured on said driving shaft adjacent said turning member, a lock member shiftably mounted on said flanged sleeve for movement toward and away from a position where said lock member engages a portion of said turning member to turn the latter together with said driving shaft, said lock member being formed with a recess, resilient means operatively connected to said lock member for urging the lock member into the engaging position, a spring loaded shutter operating means shiftably mounted on and projecting out of said camera housing, a lever pivotally mounted in said camera housing adjacent said shutter operating means to be actuated thereby, and having a free end engaging said recess of said lock member to move the latter out of the engaging position upon actuation of said shutter operating means, and spring means operatively connected to said turning member to be tensioned by turning of said turning member together with said driving shaft and to turn said turning member independently of said driving shaft upon movement of said lock member out of its operative position.

9. In a roll film camera as defined in claim 5, said release mechanism including a second crank on the opposite end of each of said eccentrically disposed turnable shafts, a turning member being coaxially and turnably mounted for free rotation on said driving shaft, and said turning member being provided at its bottom portion with an annular space having a cylindrical side wall and an inwardly projecting cam at the bottom edge of said side wall and turnable with said side wall through a path intersecting a part of one of said second cranks, so as to engage and turn said second crank upon turning of said turning member.

10. In a roll film camera as defined in claim 5, said releasing mechanism including a second crank on the opposite end of each of said eccentrically disposed turnable shafts, a turning member being coaxially and turnably mounted for free rotation on said driving shaft, a flanged sleeve secured on said driving shaft adjacent to said turning member, a lock member shiftably mounted on said flanged sleeve for movement toward and away from a position where said lock member engages a portion of said turning member to turn the latter together with said driving shaft, said driving shaft being formed with an axial bore, said driving shaft and said flanged sleeve formed with communicating lateral longitudinal slots communicating with said axial bore and located intermediate the flanges of said flanged sleeve, an elongated rod freely shiftably disposed within said axial bore of said driving shaft, a transverse rod fixed to said elongated rod and extending through said lateral slots of said driving shaft and said sleeve, said transverse rod being located over and against a part of one of said second cranks, and a control lever spring-influenced and pivotally mounted in said camera housing in engagement with the upper end of said elongated rod for depressing the latter and said transverse rod in an axial direction to turn one of said second cranks for releasing the second pair of curtain rollers, and a spring located in said axial bore of said driving shaft and urging said elongated rod upwardly toward said control lever, a releasable lock member for interconnecting said turning member and said driving shaft for simultaneous turning movement and for releasing said turning member from said driving shaft, and spring means operatively connected to said turning member tensioned by turning of said turning member together with said driving shaft and to turn said turning member independently of said driving shaft upon release of said turning member from said driving shaft.

11. In a roll film camera as defined in claim 5, said releasing mechanism including a second crank on the opposite end of each of said eccentrically disposed turnable shafts, a turning member coaxially and turnably mounted for free rotation on said driving shaft, a flanged sleeve secured on said driving shaft adjacent to said turning member, a lock member shiftably mounted on said flanged sleeve for movement toward and away from a position where said lock member engages a portion of said turning member to turn the latter together with said driving shaft; said driving shaft being formed with an axial bore, said driving shaft and said flanged sleeve formed with communicating lateral longitudinal slots communicating with said axial bore and located intermediate the flanges of said flanged sleeve, and an elongated rod freely shiftably disposed within said axial bore of said driving shaft, a transverse rod fixed to said elongated rod and extending through said lateral slots of said driving shaft and said sleeve, said transverse rod being located over and against a part of one of said second cranks, and a control lever spring-influenced and pivotally mounted in said camera housing for rotation about a pivot pin extending transversely to the axis of said driving shaft, and said turning member being formed at its upper end with a cylindrical space, an annular seat at the upper end of said space, an annular groove at the bottom of said space and a lateral helical groove between said seat and said annular groove into which the free end of said control lever extends so that said control lever moves respectively toward and away from said elongated rod during rotation of said turning member in opposite direction, so that said control lever respectively moves into said annular groove and on said annular seat during the rotation of said turnable member in opposite direction.

12. In a roll film camera as defined in claim 11, said pivot pin of said control lever being carried by a plate-like support which is turnably mounted in one wall of said camera housing for rotation about the axis of said driving shaft so that said support may be turned to adjust the angular position of said control lever with respect to said turning member to thereby regulate the time when said elongated rod and said transverse rod begin to move downwardly to turn said second crank for releasing the second curtain.

13. In a roll film camera as defined in claim 11, said curtain rollers of said first leading curtain and the latter being substantially identical with and of the same weight as said curtain rollers of said second curtain and the latter respectively, each of said curtains having a covering portion and a pair of bands extending therefrom, said bands of said first curtain being connected to the corresponding release curtain roller and said covering portion of said first curtain being connected to the corresponding spring actuated curtain roller, said bands of said second curtain being connected to the corresponding spring actuated curtain roller and said covering portion of said second curtain being connected to the corresponding release curtain roller.

References Cited in the file of this patent

UNITED STATES PATENTS

| | | |
|---|---|---|
| 624,705 | Thornton | May 9, 1899 |
| 2,171,660 | Leitz et al. | Sept. 5, 1939 |
| 2,192,500 | Leitz | Mar. 5, 1940 |
| 2,338,628 | Fairbanks | Jan. 4, 1944 |

FOREIGN PATENTS

| | | |
|---|---|---|
| 514,463 | Belgium | Oct. 15, 1952 |